(12) United States Patent
Northrup et al.

(10) Patent No.: US 10,592,738 B2
(45) Date of Patent: Mar. 17, 2020

(54) COGNITIVE DOCUMENT IMAGE DIGITALIZATION

(71) Applicant: INTERNATIONAL BUSINESS MACHINES CORPORATION, Armonk, NY (US)

(72) Inventors: Kevin Northrup, North York (CA); Craig M. Trim, Sylmar, CA (US); Badr Khamis, Halifax (CA); Karan Sehgal, Bangalore (IN); Abisola Adeniran, Halifax (CA); Chandrashekhar Padole, Thane (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/829,304

(22) Filed: Dec. 1, 2017

(65) Prior Publication Data

US 2019/0171873 A1 Jun. 6, 2019

(51) Int. Cl.
*G06K 9/00* (2006.01)
*G06K 9/62* (2006.01)

(52) U.S. Cl.
CPC ....... *G06K 9/00456* (2013.01); *G06K 9/6262* (2013.01); *G06K 9/00463* (2013.01); *G06K 2009/00489* (2013.01); *G06K 2209/01* (2013.01)

(58) Field of Classification Search
None
See application file for complete search history.

(56) References Cited

U.S. PATENT DOCUMENTS

| 5,721,938 | A  | 2/1998  | Stuckey        |
| 7,730,085 | B2 | 6/2010  | Hassan et al.  |
| 7,849,048 | B2 | 12/2010 | Langseth et al.|
| 8,402,026 | B2 | 3/2013  | Gallivan       |
| 8,571,809 | B2 | 10/2013 | Knowles        |
| 8,645,819 | B2 | 2/2014  | Dejean         |

(Continued)

FOREIGN PATENT DOCUMENTS

| CN | 104978742 A | 10/2015 |
| CN | 105279484 A | 1/2016  |
| CN | 105487774 A | 4/2016  |

OTHER PUBLICATIONS

International Search Report and Written Opinion for PCT/IB2018/059248 dated Mar. 19, 2019, pp. 1-12.

(Continued)

*Primary Examiner* — Vikkram Bali
(74) *Attorney, Agent, or Firm* — James Nock, Esq.; George S. Blasiak, Esq.; Heslin Rothenberg Farley & Mesiti P.C.

(57) ABSTRACT

Methods, computer program products, and systems are presented. The methods include, for instance: obtaining a document image with objects and identifying microblocks corresponding to each object. Analyzing a position of a microblock for collinearity with another microblock based on respective positional characteristics and adjustable collinearity parameters. Collinear microblocks are identified into a macroblock and computational data of a key-value pair is created from the macroblock. A heuristic confidence level is associated with the key-value pair. Also based on data cluster formation, a table may be classified and data extracted.

13 Claims, 15 Drawing Sheets

(56) References Cited

U.S. PATENT DOCUMENTS

| | | | |
|---|---|---|---|
| 9,043,197 | B1 | 5/2015 | Pasca et al. |
| 9,110,882 | B2 | 8/2015 | Overell et al. |
| 9,471,550 | B2* | 10/2016 | Boutelle ............... G06F 17/227 |
| 9,471,627 | B2 | 10/2016 | Boyle et al. |
| 9,569,733 | B2 | 2/2017 | Nassar et al. |
| 9,704,104 | B2 | 7/2017 | Nassar et al. |
| 2001/0032218 | A1* | 10/2001 | Huang ................. G06F 17/218 715/234 |
| 2011/0066662 | A1 | 3/2011 | Davis |
| 2012/0102388 | A1* | 4/2012 | Fan ...................... G06F 17/218 715/234 |
| 2014/0201126 | A1* | 7/2014 | Zadeh .................... G06N 7/005 706/52 |
| 2015/0331936 | A1 | 11/2015 | Alqadah |
| 2016/0085852 | A1 | 3/2016 | Deshpande et al. |
| 2016/0239500 | A1 | 8/2016 | Dave et al. |
| 2016/0314104 | A1 | 10/2016 | Phillips et al. |
| 2017/0243118 | A1 | 8/2017 | Nassar et al. |

OTHER PUBLICATIONS

Francopoulo, G., et al., "A Study of Reuse and Plagiarism in LREC papers," LREC. 2016. Retrieved from Internet using: http://www.lrec-conf.org/proceedings/lrec2016/pdf/85_Paper.pdf.

Bogdanova, D., "Extraction of High-Level Semantically Rich Features from Natural Language Text," ADBIS (2). 2011. Retrieved from Internet using: https://pdfs.semanticscholar.org/44c7/5a150375a48a48aefb7424e032c5e51f3b22.pdf.

Bhalerao, T.S., et al., "A Strategy for Automatically Extracting References from PDF Documents," International Journal 2, No. 5 (2017). Retrieved from Internet using: http://www.ijstmr.com/wp-content/uploads/2017/05/IJSTMR_V2I5_02113.pdf.

Gammon, R., "Cut the Cost of Paying Invoices," Transform Magazine 13 (2004): 28-33. Retrieved from Internet using: http://www.issltd.com/products/Kofax/A4P%20Transform%20Article.pdf.

Du et al., "Extracting Building Patterns With Multilevel Graph Partition and Building Grouping", ISPRS Journal, vol. 122, Dec. 2016, pp. 81-96.

Zhang, et al.; "Building Pattern Recognition in Topographic Data: Examples on Collinear and Curvilinear Alignments", Geoinformatics, vol. 17, Issue 1, Jan. 2013, pp. 1-33.

Bansal, et al.; "Table Extraction From Document Images Using Fixed Point Model", ICVGIP'14 ACM Indian Conference On, Article No. 67, Dec. 14-18, 2014, pp. 1-8.

Bauer, et al.; "The Soft-Collinear Effective Theory", TASL Lecture Notes, Oct. 14, 2014, pp. 1-91.

Mell, Peter, et al., "The NIST Definition of Cloud Computing", NIST Special Publication 800-145, Sep. 2011, Gaithersburg, MD, 7 pgs.

* cited by examiner

570

| | Column 1 | Column 2 | Column 3 |
|---|---|---|---|
| 571 | | | |
| 572 | Surface | Permafrost | Major Accumulations |
| 573 | Heavy Oil | - | Ugnu Heavy Oil |
| 574 | Viscous Oil | - | West Sak & Schrader Bluff |
| | 5,000 ft | | |
| 575 | | - | Kuparuk |
| 576 | Light Oil | - | Prudhoe, Pt Mac, Northstar |
| 577 | Light Oil | - | Lisburne |
| 578 | 10,000 ft | - | Liberty, Endicott |
| 579 | - | - | - |

FIG. 7

| | Crude Oils | Viscosity (centipoise) | Column 3 | Familiar substances |
|---|---|---|---|---|
| 601 | | | | |
| 602 | Tar, Bitumen | $10^8$ | /ref-img-01/ | Window Putty |
| 603 | Tar, Bitumen | $10^7$ | /ref-img-02/ | Caulk |
| 604 | Extra Heavy Oil | $10^6$ | /ref-img-03/ | Vegetable shortening |
| 605 | Extra Heavy Oil | $10^6$ | /ref-img-04/ | Peanut butter |
| 606 | Extra Heavy Oil | $10^5$ | /ref-img-05/ | Tomato ketchup |
| 607 | Heavy Oil | $10^4$ | /ref-img-06/ | Molasses |
| 608 | Heavy Oil | $10^3$ | /ref-img-07/ | Honey |
| 609 | Viscous Oil | $10^2$ | /ref-img-08/ | Maple syrup |
| 610 | Viscous Oil | 10 | /ref-img-09/ | Corn oil |
| 611 | Light Oil | 1 | /ref-img-10/ | Water |

| Description | Price |
|---|---|
| J33409 Hydro of CO2 cylinder | 117.50 |

Order Number 9383553
Hydrostatically test CO2 cylinder
Comprising

| 1 x #TFIR.CO2.+50 pressure test co2 extinguisher, | 137.50 |
| 20% discount | -27.50 |
| 1 x #CONSUMABLES Workshop Consumables | 7.50 |

COGNITIVE DOCUMENT IMAGE DIGITALIZATION

TECHNICAL FIELD

The present disclosure relates to document processing technology, and more particularly to methods, computer program products, and systems for cognitively digitizing data from document images.

BACKGROUND

In conventional document processing, ink-on-paper documents are scanned page by page as respective visual images in preparation. A resulting document file of scanned papers is typically a series of visual image of pages. Each visual image of a page does not have accessible content, and existing document processing applications may digitize certain visual image patterns into digitized data, which may be accessible and operational by use of corresponding computer program application. Such data digitizing process of visual images are often referred to as extraction, or data extraction. In light of the amount of information represented in legacy paper forms and scanned documents images, extraction of such document images may greatly affect general productivity in many areas of industry as well as society.

SUMMARY

The shortcomings of the prior art are overcome, and additional advantages are provided, through the provision, in one aspect, of a method. The method for extracting data from a document image includes, for instance: obtaining, by one or more processor of a computer, the document image, where the document image includes a plurality of objects; identifying a plurality of microblocks respectively corresponding to the plurality of objects, where each of the microblocks is associated with a content, a position, and a style; discovering that a first microblock is collinear with a second microblock based on respective positional characteristics of the first microblock and the second microblock and adjustable collinearity parameters; identifying a macroblock with the first microblock and the second microblock, where the macroblock constitutes a key-value pair that is computational by computer programs; associating a confidence level with the key-value pair based on heuristics; and communicating the key-value pair and the associated confidence level to a user.

The shortcomings of the prior art are overcome, and additional advantages are provided, through the provision, in one aspect, of a method. The method for extracting data from an image of a tabular object cluster includes, for example: obtaining, by one or more processor of a computer, the document image, where the document image includes a tabular object cluster; identifying a plurality of macroblocks in the tabular object cluster, where respective macroblocks include collinear objects; locating, within each macroblock, one or more candidate cells from respective microblocks; classifying the tabular object cluster, based on the located candidate cells, into a table class from a predefined set of table classes; extracting, according to the table class, data from the one or more candidate cells for each macroblock, where the extracted data is computational by computer programs; and creating one or more two-dimensional (2D) array from the extracted data, where the one or more 2D array has a number of macroblocks in the tabular object cluster for a first dimension.

The shortcomings of the prior art are overcome, and additional advantages are provided, through the provision, in one aspect, of a computer program product including a computer readable storage medium readable by one or more processor and storing instructions for execution by the one or more processor for performing a method for extracting data from a document image, for instance: obtaining, by one or more processor of a computer, the document image, where the document image includes a plurality of objects; identifying a plurality of microblocks respectively corresponding to the plurality of objects, where each of the microblocks is associated with a content, a position, and a style; discovering that a first microblock is collinear with a second microblock based on respective positional characteristics of the first microblock and the second microblock and adjustable collinearity parameters; identifying a macroblock with the first microblock and the second microblock, where the macroblock constitutes a key-value pair that is computational by computer programs; associating a confidence level with the key-value pair based on heuristics; and communicating the key-value pair and the associated confidence level to a user.

The shortcomings of the prior art are overcome, and additional advantages are provided, through the provision, in one aspect, of a computer program product including a computer readable storage medium readable by one or more processor and storing instructions for execution by the one or more processor for performing a method for extracting data from a document image, for instance: obtaining, by one or more processor of a computer, the document image, where the document image includes a tabular object cluster; identifying a plurality of macroblocks in the tabular object cluster, where respective macroblocks include collinear objects; locating, within each macroblock, one or more candidate cells from respective microblocks; classifying the tabular object cluster, based on the located candidate cells, into a table class from a predefined set of table classes; extracting, according to the table class, data from the one or more candidate cells for each macroblock, where the extracted data is computational by computer programs; and creating one or more two-dimensional (2D) array from the extracted data, where the one or more 2D array has a number of macroblocks in the tabular object cluster for a first dimension.

The shortcomings of the prior art are overcome, and additional advantages are provided, through the provision, in one aspect, of a system including: a memory; one or more processor in communication with memory; and program instructions executable by the one or more processor via the memory to perform a method for extracting data from a document image including: obtaining, by one or more processor of a computer, the document image, where the document image includes a plurality of objects; identifying a plurality of microblocks respectively corresponding to the plurality of objects, where each of the microblocks is associated with a content, a position, and a style; discovering that a first microblock is collinear with a second microblock based on respective positional characteristics of the first microblock and the second microblock and adjustable collinearity parameters; identifying a macroblock with the first microblock and the second microblock, where the macroblock constitutes a key-value pair that is computational by computer programs; associating a confidence level with the key-value pair based on heuristics; and communicating the key-value pair and the associated confidence level to a user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 depicts a table corresponding to the tabular object cluster of FIG. 6, as created by the cognitive document digitization engine, in accordance with one or more embodiments set forth herein;

FIG. 10 depicts a table corresponding to the exemplary tabular object cluster of FIG. 8, as created by the cognitive document digitization engine, in accordance with one or more embodiments set forth herein;

FIG. 11 depicts a portion of still another exemplary tabular object cluster, in accordance with one or more embodiments set forth herein;

DETAILED DESCRIPTION

Figure 1:
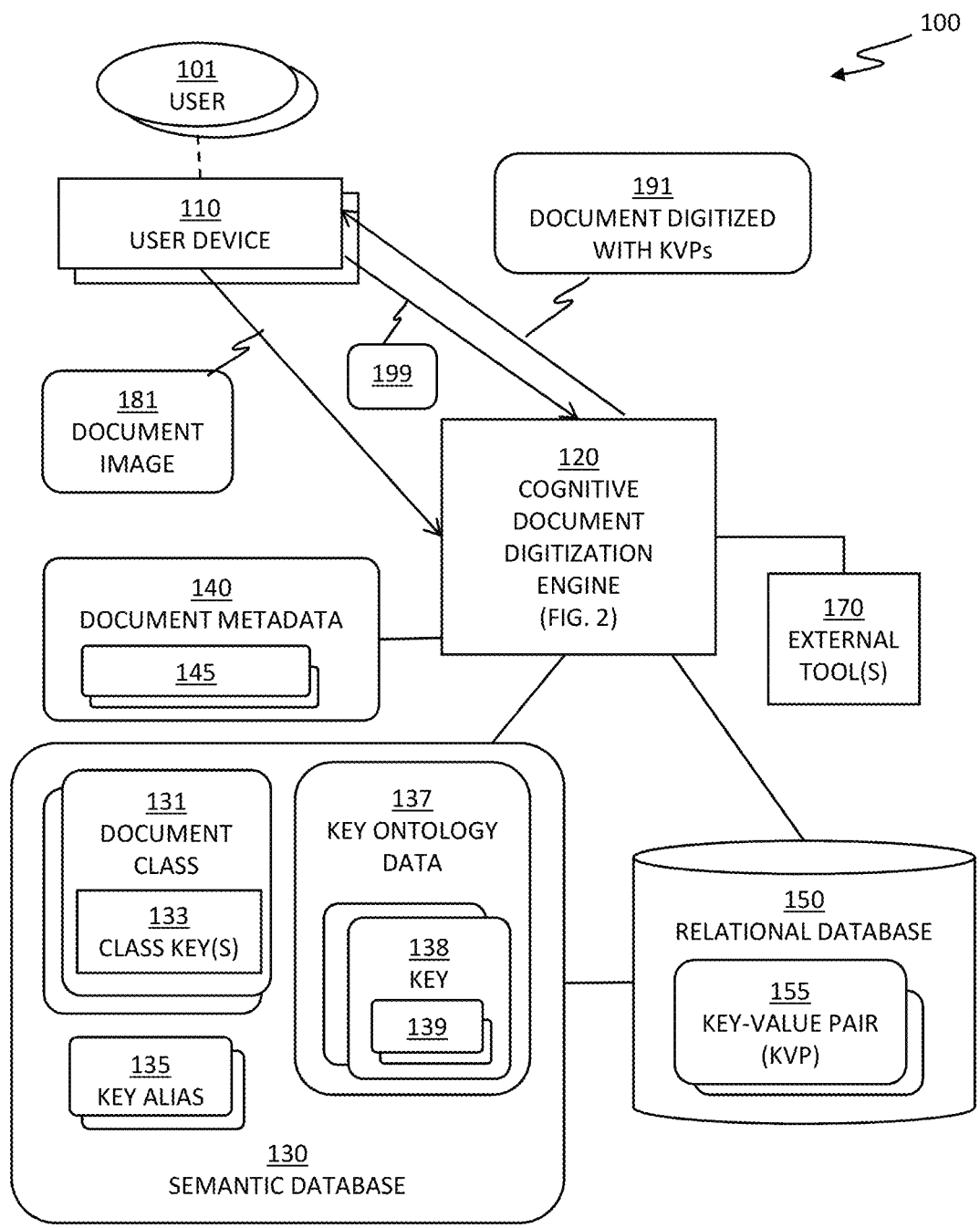
FIG. 1 depicts a system for cognitively digitizing document images, in accordance with one or more embodiments set forth herein.

FIG. 1 depicts a system 100 for cognitively digitizing document images, in accordance with one or more embodiments set forth herein.

Extracting computational data from document image is often unsuccessful due to wide variety of custom formats, individual styles, diverse alignments, and non-text contents. Consequently, enormous amount of information represented in documents images are not as accessible as fully digitized documents. Document images without digitization have limited usages such as visual viewing and archival purposes. In the alternative, the time and cost required for manual digitization of such document images would be prohibitive, considering the number of documents that would be benefited from digitization.

Digital documents are often preferred for the convenience in computationally using data represented in the documents. When pen-on-paper documents are scanned in, the documents are a series of visual image of pages, but not computationally ready for usage as digital data. Accordingly, many document digitization applications have been developed in order to accurately extract computational data from document images. In existing document processing applications, numerous custom formats and organizations of documents present challenges in processing visual images of a document and extracting computational data out of the document. Embodiments of the present invention implements a cognitive digitization process of document images as human readers understand meanings conveyed by visual marks in documents, and improves efficiency and accuracy of data extraction from document images.

The system 100 includes a cognitive document digitization engine 120. The cognitive document digitization engine 120 receives a document image 181 from a user 101 via a user device 110. The document image 181 is a visual image of a document created for a certain information, which is not computational data. For example, a scanned image of a paper document does not have any digitized data so text in the scanned image may not be searched or be read into another application as data input. The document image 181 has numerous objects, which may be extracted as computational data. In this specification, the term "object" refers to an identifiable individual entity in the document image, and the term "microblock" refers to the smallest unit of candidate data identified from a corresponding object in the document, for various analyses in order to find relationships among the objects. The cognitive document digitization engine 120 represents each microblock with numerous microblock characteristics 145, including content, position, style of each microblock.

The cognitive document digitization engine 120 automatically extracts data from the document image 181 based on multi-layered collinearity analysis such that the information extracted from images of texts and numbers in the document image 181 may be computational data that is usable by other programs and applications. A relational database 150 coupled to the cognitive document digitization engine 120 stores a key-value pair (KVP) 155 of a plurality of KVPs corresponding to the data extracted from the document image 181. The cognitive document digitization engine 120 associates the key-value pairs with respective confidence levels. The term "key-value pair" refers to a primary data representation unit with a key and a value, in which the key describes or identifies the value. The KVPs may be hierarchically organized into a larger data structure, as often seen in relational database tables.

The cognitive document digitization engine 120 may use one or more external tool 170 such as Optical Character Recognition (OCR) applications in order to capture document metadata 140, including microblock characteristics 145 for all objects in the document image 181, which are identified as respective microblocks. In this specification, the term "collinearity" refers to a geometrical alignment among recognizable objects in the document image 181 as the cognitive document digitization engine 120 deems meaningful in order to identify a macroblock based on two or more microblocks as being collinear; term "microblock" refers to individual object recognized from the document image 181; and term "macroblock" refers to a group of two or more microblocks to form a meaningful data unit such as a Key-Value Pair (KVP) and a column, or a row, in a table.

With conventional document image processing, discovering collinearity correctly in documents of countless custom formats for extracting usable data is an ongoing process. The cognitive document digitization engine 120 utilizes a multi-layered approach with collinearity and semantics, in order to achieve a more comprehensive recognition of the document image 181 than conventional document image processing applications, and in order to extract usable data from the document image 181 as a result.

The cognitive document digitization engine 120 analyzes collinearity amongst the microblocks based on a plurality of adjustable collinearity parameters, in order to extract computational data from a plurality of microblocks determined to be aligned in the document image 181. Examples of cohesive data may include individual key-value pairs and sets of KVPs as in a table in a document. Examples of the adjustable collinearity parameters may include, but are not limited to, font size and style changes, alignments, and punctuations. A key-value pair is a macroblock that includes two microblocks, as the key is a microblock and the value is another microblock, where the two microblocks align with one another based on the collinearity analysis by the cognitive document digitization engine 120.

The cognitive document digitization engine 120 further utilizes various semantic information stored in a semantic database 130 in order to extract data from the document image 181. A few examples of the information in the semantic database 130 may include, but are not limited to, one or more document class 131, one or more key alias 135, and key ontology data 137. Detailed operations of the cognitive document digitization engine 120 is described in FIGS. 2, 3, and 4.

In the semantic database 130, each of the one or more document class 131 corresponds to one or more class keys 133, that any document in each document class is to include. For example, when a document is of a purchase invoice class, a corresponding class key may include, but are not limited to, a name, a transaction date, an item list, an amount, etc.

In the semantic database 130, the one or more key alias 135 includes aliases for numerous keys, which may appear in the document image 181 in place of a key. The one or more key alias 135 is often looked up for the one or more class keys 133, because all the class keys corresponding to a class are to appear in one document. For example, the class key may specify an "Account Number" class key, but the document image 181 may have a key with "Acct. #" text, but not a text of "Account Number". The one or more key alias 135 lists interchangeable names, such as "Account Number" and "Acct. #" in order to accommodate analysis and data extraction of wide variety of customized documents.

Key ontology data 137 of the semantic database 130 defines a set of constraints and meanings modeling a domain of knowledge represented by the document image 181. The key ontology data 137 includes a plurality of keys that may present in the document image 181. A key 138 among the plurality of keys is associated with various characteristics including properties of the key 138, one or more sets to which the key 138 belongs, and relationships among members of a same set of the one or more sets. Also, the cognitive document digitization engine 120 may conclude that two semantically associated text blocks are collinear. For example, the key 138 may have a data type 139 property specifying a proper data type of a value for the key 138, such as a text string for a CustomerLastName key, an eight-digit number for a DateOfBirth key. In the same example, if a text string has a common name value such as "Johnson", the cognitive document digitization engine 120 may determine the CustomerLastName key and the text string "Johnson" as a KVP, even though the text string is misaligned with the key within a proximity range. In the same example, the cognitive document digitization engine 120 runs a classifier (one of the external tools 170) with the text string "Johnson" in order to determine that the text string "Johnson" is a data type for names. For another example, the key 138 may be one of the one or more class keys 133, and have relationships with other class keys defined in the key ontology data 137, such as an Invoice document class includes both a CustomerNumber class key and an Amount class key.

Figure 2:
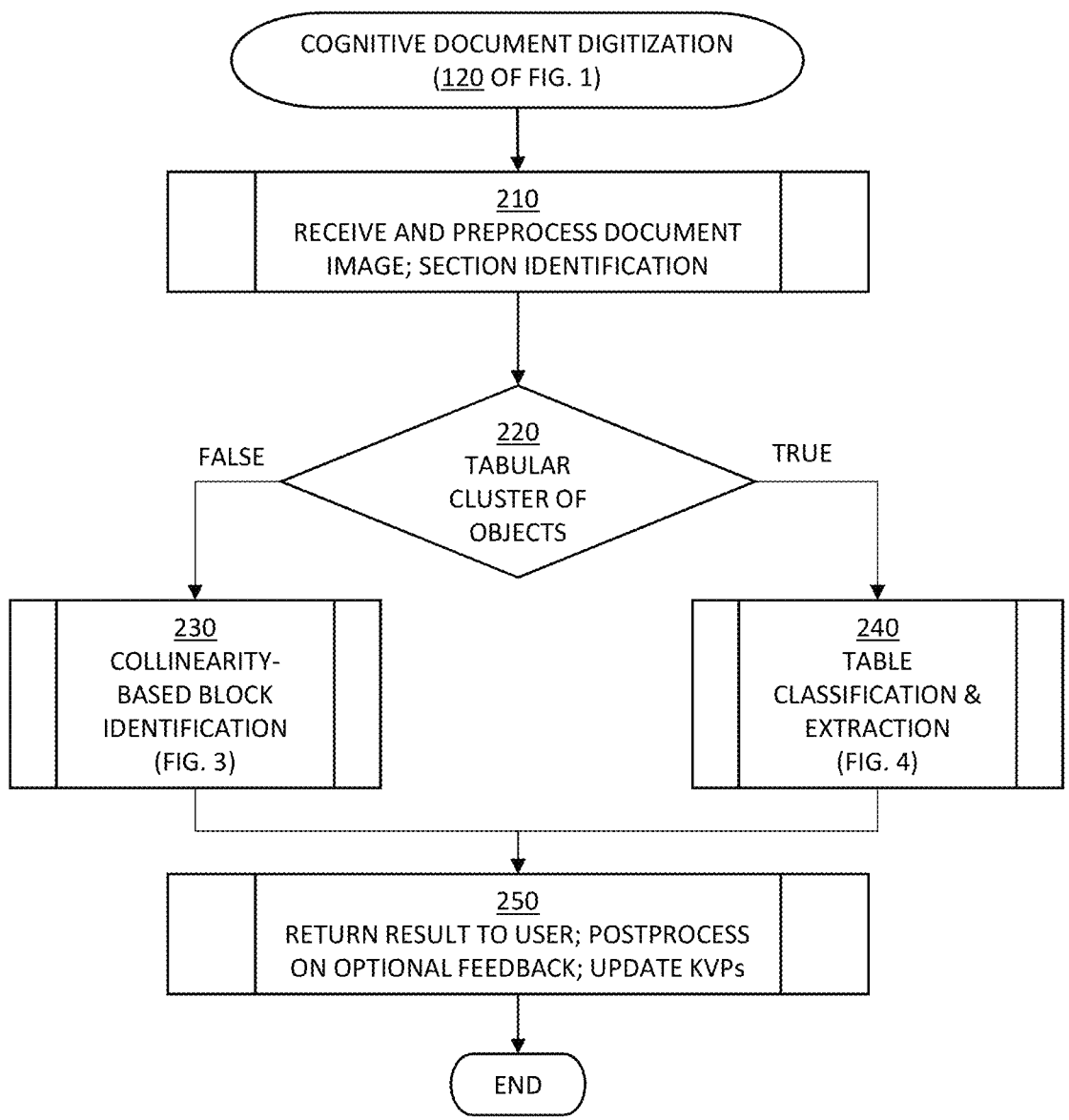
FIG. 2 depicts a flowchart of operations performed by the cognitive document digitization engine, in accordance with one or more embodiments set forth herein.

FIG. 2 depicts a flowchart of operations performed by the cognitive document digitization engine 120 of FIG. 1, in accordance with one or more embodiments set forth herein.

In block 210, the cognitive document digitization engine 120 receives a document image and processes the document image. The received document image may have more than one distinctive visual pattern in one page. The cognitive document digitization engine 120 identifies such patterns as respective sections in the document. In this specification, the term "object" refers to an image object in the document image, and the term "microblock" refers to an indivisible unit block identified from a corresponding image object, for collinearity analysis. Then the cognitive document digitization engine 120 proceeds with block 220.

In block 220, the cognitive document digitization engine 120 determines whether or not any tabular cluster of objects has been discovered in respective sections of the document image. If the cognitive document digitization engine 120 had not discovered any tabular cluster of objects in the document, then the cognitive document digitization engine 120 proceeds with block 230. If the cognitive document digitization engine 120 discovered one or more tabular cluster of objects in the document, then the cognitive document digitization engine 120 proceeds with block 240.

In block 230, the cognitive document digitization engine 120 analyzes microblocks in the document image 181 and identifies macroblocks based on extended collinearity analysis of the microblocks. Detailed operations of block 230 are described in FIG. 3 and corresponding description. Then the cognitive document digitization engine 120 proceeds with block 250.

In block 240, the cognitive document digitization engine 120 respectively analyzes the tabular clusters discovered in the document image and identifies a table based on extended collinearity analysis on the objects in each tabular cluster. A table indicates, in this specification, a two-dimensional formation of key-value pairs. Tables are most commonly used in conveying multifaceted information, and presented in various custom organizations. The cognitive document digitization engine 120 classifies a type of the identified table, in order to properly perform data extraction corresponding to the type of the table. Detailed operations of block 240 are described in FIG. 4 and corresponding description. Then the cognitive document digitization engine 120 proceeds with block 250.

In block 250, the cognitive document digitization engine 120 returns a result of digitized document image having computational data to a user. The cognitive document digitization engine 120 optionally receives a feedback on the result from the user. The cognitive document digitization engine 120 updates key-value pairs generated from block 230 and/or tables generated from block 240 according to the feedback, then terminate processing the document image 181 received in block 210.

The cognitive document digitization engine 120 may perform block 230 as well as block 240, depending on the sections in the document image 181, in order to support various formats of custom documents having a mixture of object clusters and tables of various organizations. The cognitive document digitization engine 120 may iterate block 230 and/or block 240 as necessary according to the objects present in the document image 181.

Figure 3:
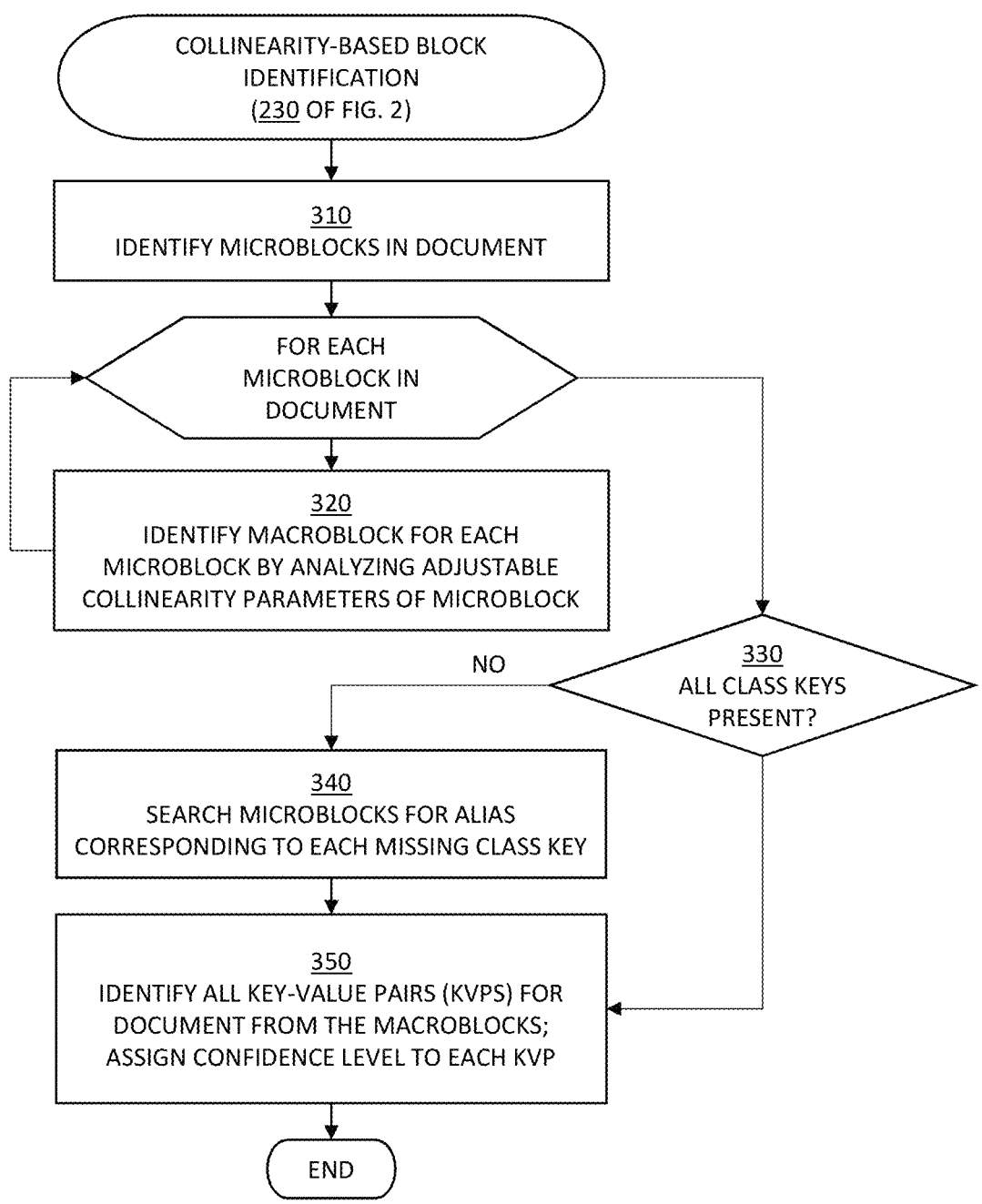
FIG. 3 depicts detailed operations of multi-layered block identification, as performed by the cognitive document digitization engine, in accordance with one or more embodiments set forth herein.

FIG. 3 depicts detailed operations of block 230 of FIG. 2, multi-layered block identification, as performed by the cognitive document digitization engine 120 of FIG. 1, in accordance with one or more embodiments set forth herein.

In block 310, the cognitive document digitization engine 120 identifies microblocks in the received document, from corresponding objects. The objects may be either a text string, a numerical number, a symbol, or a pictorial image. The cognitive document digitization engine 120 measures horizontal and vertical spaces between objects, in absolute distances and/or in relative proximities, in preparation of collinearity analysis. Then the cognitive document digitization engine 120 proceeds with block 320.

In block 320, the cognitive document digitization engine 120 identifies a macroblock corresponding to each microblock identified in block 310 by analyzing the respective positions of two or more microblocks in proximity based on adjustable collinearity parameters of the microblock. The cognitive document digitization engine 120 may identify a macroblock based on two or more microblocks that are collinear according to the adjustable collinearity parameters. The cognitive document digitization engine 120 proceeds with block 330 upon identifying respective macroblocks for all microblocks in the received document.

In one embodiment of the present invention, the cognitive document digitization engine 120 may determine that two or more microblocks are collinear based on the adjustable collinearity parameters without exact alignment when the two or more microblocks are within a certain distance range, in absolute distances or in relative positions. The adjustable collinearity parameters include: font; paragraph alignment; punctuation mark; and ontological matching. The adjustable collinearity parameter indicates that the cognitive document digitization engine 120 may associate two microblocks in a collinear relationship even though the two microblocks have distinctive fonts and different sizes/styles, have different paragraph alignments in respective microblocks, and/or are separated by a punctuation marks. Further, the cognitive document digitization engine 120 may determine the two microblocks as a macroblock based on key ontology data, in which a certain key name and a data type for the key name is specified, for example. Examples and detailed description of the adjustable collinearity parameters are presented in FIG. 5 and corresponding description.

In block 330, the cognitive document digitization engine 120 determines a class of the received document and whether or not all class keys required in the class of the document have been identified. If the cognitive document digitization engine 120 determines that any class key has not been identified, then the cognitive document digitization engine 120 proceeds with block 340. If the cognitive document digitization engine 120 determines that all class keys have been identified, then the cognitive document digitization engine 120 proceeds with block 350.

In block 340, the cognitive document digitization engine 120 examines all microblocks identified in block 310 for respective aliases corresponding to each missing class key. For each alias found in place of a missing class key, the cognitive document digitization engine 120 identifies a macroblock including the microblock having the alias, as in block 320. Then the cognitive document digitization engine 120 proceeds with block 350.

In block 350, the cognitive document digitization engine 120 identifies all Key-Value Pairs (KVPs) from the macroblocks identified in block 320 and block 340. A microblock of each macroblock may correspond to a key in a KVP, and another microblock of the same macroblock may correspond to a value in the same KVP. The cognitive document digitization engine 120 assigns a confidence level to each identified KVP. The cognitive document digitization engine 120 heuristically determines the confidence level of a KVP based on various factors such as the level of proximity, ontological matching of respective key names and data types. For keys and values frequently appearing in formal and transactional documents, the confidence levels of KVPs may be higher than custom keys and values in informal and personal documents. Then the cognitive document digitization engine 120 proceeds with block 250 of FIG. 2.

Figure 4:
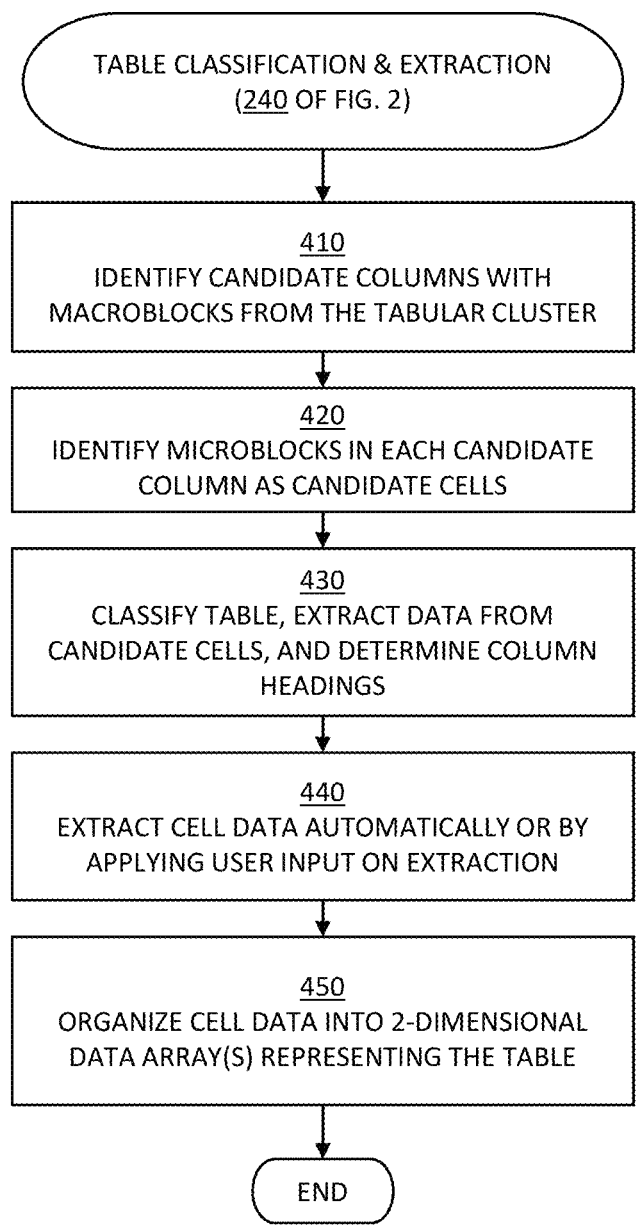
FIG. 4 depicts detailed operations of table classification and extraction, as performed by the cognitive document digitization engine, in accordance with one or more embodiments set forth herein.

FIG. 4 depicts detailed operations of block 240 of FIG. 2, table classification and extraction, as performed by the cognitive document digitization engine 120 of FIG. 1, in accordance with one or more embodiments set forth herein.

As noted, various types and formats of tables are used in numerous documents in many areas of documentation. The cognitive document digitization engine 120 classify tables in order to extract data from the table in a manner corresponding to the characteristics of the table. In certain embodiments of the present invention, the cognitive document digitization engine 120 specifies three (3) classes for tables that would benefit from respective customized extraction strategies, as described in block 430 below.

In block 410, the cognitive document digitization engine 120 identifies candidate columns with macroblocks from the tabular cluster. The cognitive document digitization engine 120 isolates the tabular cluster, or any section, from the rest of the document image and processes each tabular cluster. The cognitive document digitization engine 120 identifies candidate columns, also referred to as a macroblock, of the tabular structure by analyzing various column definition attributes. Examples of the column definition attributes may include: absolute distances between macroblocks; relative distances between macroblocks; semantic interpolation; and relative styles.

The cognitive document digitization engine 120 combines the column definition attributes heuristically in order to identify the candidate columns with the macroblocks. Then the cognitive document digitization engine 120 proceeds with block 420.

In certain embodiments of the present invention, the cognitive document digitization engine 120 may have a predefined set of spacing categories, which may include, for example, tight spacing, single spacing (normal spacing), one-and-a-half spacing, double-spacing, and wide spacing, where each spacing category indicate a distinctive likelihood of collinearity between two macroblocks separated by the respective spacing categories. The set of spacing categories may be distinctive for microblocks within each macroblock.

The cognitive document digitization engine 120 may further apply semantic interpolation based on the presence of semantic indications such as conjunctions, disjunctions, and related symbols marks indicating semantic relations. For example, both "and" and "or" express continuation in a line, as in symbols "&", "+". Symbols such as "-" and "*" are often used as a line heading marker in a list. The cognitive document digitization engine 120 may take semantic interpolation into account for macroblock identification made from the spacing categories.

Even further, the cognitive document digitization engine 120 may also take relative styling into account for macroblock identification. The semantic interpolation and the relative styling generally have respective weights less than spacing according to absolute and relative measurements. The cognitive document digitization engine 120 may assign respective weights for certain elements based on a class of the document. For example, changes in style and fonts between two blocks within a certain distance range may weigh more for form documents such as transaction documents, invoices, and government forms than informal documents such as presentation slides. Examples of column defining operations by the cognitive document digitization engine 120 are presented in FIGS. 6 and 8 and descriptions.

In block 420, the cognitive document digitization engine 120 identifies candidate cells in respective candidate columns based on microblocks within respective macroblocks. As tables have more than one cell in each column, the cognitive document digitization engine 120 identifies the candidate cells data as respective rows in each candidate column. In this specification, the terms "column" and "row" may be reversed based on how the tabular cluster is organized. Where the cognitive the cognitive document digitization engine 120 first identify candidate rows with macroblocks, then the column microblocks are identified as a candidate cell within each row. Then the cognitive document digitization engine 120 proceeds with block 430.

In block 430, the cognitive document digitization engine 120 classifies the table formed by the candidate cells identified from block 420. The cognitive document digitization engine 120 extracts data from the candidate cells according to the table class, and determines respective headings for each columns in the table based on semantics analysis of the extracted cell data. For example, for a first cell having a text "quantity" in a column where the rest of cells are numeric data, the cognitive document digitization engine 120 may determine the "quantity" cell as a heading for the column with a high confidence level. Then the cognitive document digitization engine 120 proceeds with block 440.

In one embodiment of the present invention, the cognitive document digitization engine 120 utilizes three (3) special classes for a table, which include: tables with merged cells; tables with indefinite cell borders; and tables with nested cells. Because the table class indicates presence of a certain type of cell in a table to expedite extraction of data from the types of cells, one or more table class may be concurrently applicable for one table, which is processed for each table class. Examples of respective table classes and extraction are presented in FIGS. 6-7, 8-10, and 11-12, and respectively corresponding descriptions.

In block 440, the cognitive document digitization engine 120 extracts cell data automatically and/or by applying an optional user input on extraction. The cognitive document digitization engine 120 provides a user interface for guiding tabular semantics for the table classification and the cell data extraction, as a feedback to extracted data when the extraction is not sufficient or for simply assisting the classification and extraction. Then the cognitive document digitization engine 120 proceeds with block 450.

In block 450, the cognitive document digitization engine 120 organizes the data extracted from the candidate cells into one or more multidimensional data array representing the table. For example, one column may form an array, and a table may form a matrix, also referred to as a 2-dimensional array. For computational availability of the data, the cognitive document digitization engine 120 creates the multi-dimensional arrays in a format compatible with multi-dimensional array processing and calculation libraries such as Python NumPy. Then the cognitive document digitization engine 120 proceeds with block 250 of FIG. 2.

Figure 5:
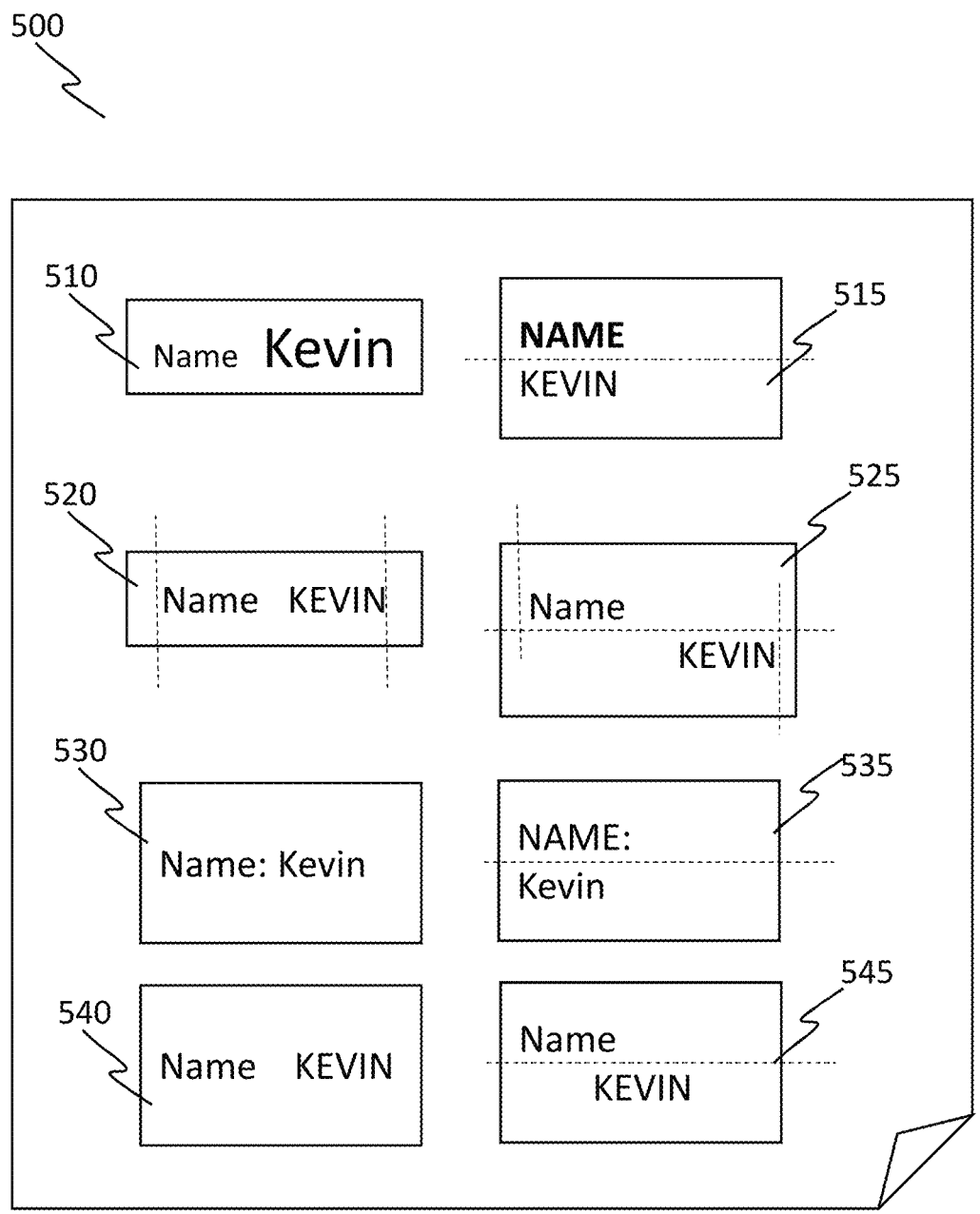
FIG. 5 depicts exemplary document images, to which adjustable block identification parameters are applied in order to identify macroblocks, in accordance with one or more embodiments set forth herein.

FIG. 5 depicts exemplary document images, to which adjustable block identification parameters are applied in order to identify macroblocks, in accordance with one or more embodiments set forth herein.

A document 500 includes two microblocks in various configurations. A first microblock has a text string "Name", and a second microblock has a text string "Kevin". "Name" text in the first microblock may be extracted as a key and "Kevin" text in the second microblock may be extracted as a value of the Name key, from which the cognitive document digitization engine 120 identifies a macroblock, or a Key-Value pair (KVP), Name="Kevin".

Configuration 510 depicts different font sizes in two adjacent microblocks, where "Name" microblock has a font smaller than the font of "Kevin" microblock. With existing document processing applications, font differences including size changes would prevent the two microblocks from being identified as a macroblock (KVP), which would otherwise form a KVP. The cognitive document digitization engine 120 is enabled to identify two microblocks having different font sizes as one macroblock (KVP), by using an adjustable collinearity parameter on font sizes.

Configuration 515 depicts different text styles in two vertically adjacent microblocks, where "Name" microblock is boldfaced but "Kevin" microblock has a normal face in the next line. With existing document processing applications, text style differences including typeface changes, for example, when a normal text is boldfaced, italicized, and underlined, would prevent the two microblocks from being identified as a macroblock (KVP), which would otherwise form a KVP. The cognitive document digitization engine 120 is enabled to identify two microblocks having different text styles as one macroblock (KVP), by using an adjustable collinearity parameter on text styles.

Configuration 520 depicts different paragraph alignments in two adjacent microblocks, where "Name" microblock is left aligned but "Kevin" microblock is aligned on the right end. With existing document processing applications, paragraph alignment differences as shown above would prevent the two microblocks from being identified as a macroblock (KVP), which would otherwise form a KVP. The cognitive document digitization engine 120 is enabled to identify two microblocks having different paragraph alignments as one macroblock (KVP), by using an adjustable collinearity parameter on paragraph alignments.

Configuration 525 depicts different paragraph alignments in two vertically adjacent microblocks, where "Name" microblock is left aligned but "Kevin" microblock is aligned on the right end in the next line. With existing document processing applications, paragraph alignment differences as shown above would prevent the two microblocks in respective lines from being identified as a macroblock (KVP), which would otherwise form a KVP. The cognitive document digitization engine 120 is enabled to identify two microblocks in respective lines having different paragraph alignments as one macroblock (KVP), by using an adjustable collinearity parameter on paragraph alignments.

Configuration 530 depicts two adjacent microblocks being separated by a punctuation mark, where ":", a colon is placed between "Name" microblock and "Kevin" microblock. With existing document processing applications, a separating punctuation mark as shown above may prevent the two microblocks from being identified as a macroblock (KVP), which would otherwise form a KVP. The cognitive document digitization engine 120 is enabled to identify two microblocks separated by a punctuation mark as one macroblock (KVP), by using an adjustable collinearity parameter on punctuation mark separation.

Configuration 535 depicts two vertically adjacent microblocks being separated by a punctuation mark, where ":", a colon is placed between "Name" microblock and "Kevin" microblock in the next line. With existing document processing applications, a separating punctuation mark as shown above may prevent the two microblocks in respective lines from being identified as a macroblock (KVP), which would otherwise form a KVP. The cognitive document digitization engine 120 is enabled to identify two microblocks in respective lines separated by a punctuation mark as one macroblock (KVP), by using an adjustable collinearity parameter on punctuation mark separation.

Configuration 540 depicts two adjacent microblocks being separated by a wide space, where the wide space between "Name" microblock and "Kevin" microblock ordinarily prevents the two microblocks from being identified as a macroblock (KVP) with existing document processing applications. The cognitive document digitization engine 120 is enabled to identify two microblocks separated by such wide space as one macroblock (KVP), by semantically analyzing texts of the two microblocks and by matching keys and values based on key ontology data, as "Kevin" is of a proper data type for a value for "Name" key.

Configuration 545 depicts two vertically adjacent microblocks being separated by a wide space, where the wide space between "Name" microblock and "Kevin" microblock in the next line ordinarily prevents the two microblocks from being identified as a macroblock (KVP) in existing document processing applications. The cognitive document digitization engine 120 is enabled to identify two microblocks in respective lines separated by such wide space as one macroblock (KVP), by semantically analyzing texts of the two microblocks and by matching keys and values based on key ontology data, as "Kevin" is of a proper data type for a value for "Name" key.

Figure 6:
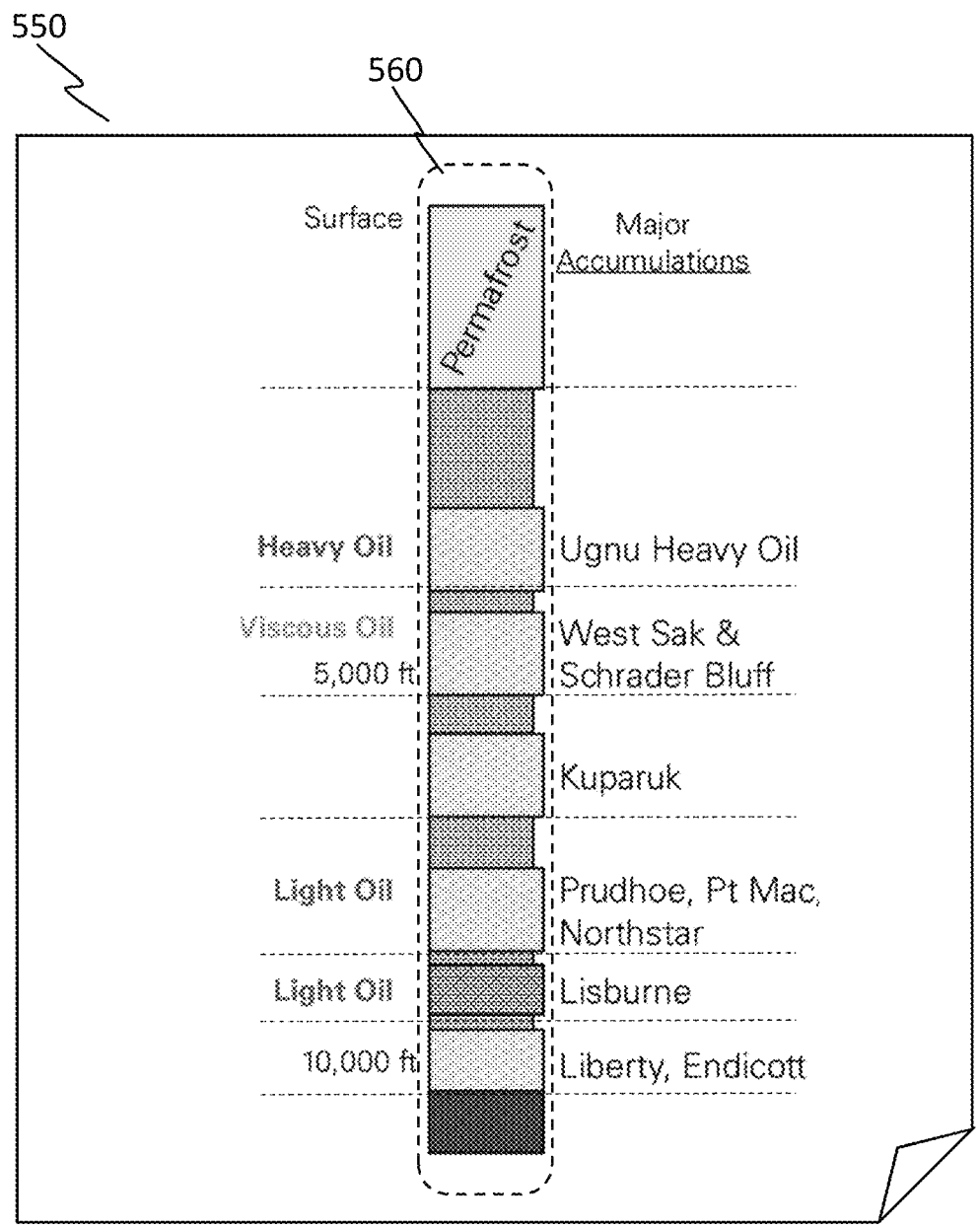
FIG. 6 depicts an exemplary tabular object cluster, in accordance with one or more embodiments set forth herein.

FIG. 6 depicts an exemplary tabular object cluster 550, in accordance with one or more embodiments set forth herein.

As noted in description of block 430 in FIG. 4, one of table class that requires special considerations for extracting data is a class of tables with indefinite cell borders. The tabular object cluster 550 is an example classified as the class having indefinite cell borders. Human readers would recognize the tabular object cluster 550 as a table with ease, but existing document processing applications would fail to identify the tabular object cluster 550 as a table and/or would fail to accurately extract data from the tabular object cluster 550, particularly because of the indefinite cell borders shown in a layered box section 560.

The cognitive document digitization engine 120 identifies three (3) columns from the tabular object cluster 550, where a first column is on the left side of the layered box section 560, the layered box section 560 is a second column, and a third column is on the right side of the layered box section 560. The first column has seven (7) rows, the second column of the layered box section 560 has eight (8) rows, respective to eight (8) front boxes aligned on a background strip. The third column has seven (7) rows as in the first column. Accordingly, the tabular object cluster 550 may form a table as a 3×8 matrix. The dotted lines in the tabular object cluster 550 show respective borders between two adjacent rows in the table.

FIG. 7 depicts a table 570 corresponding to the tabular object cluster 550 of FIG. 6, as created by the cognitive document digitization engine 120, in accordance with one or more embodiments set forth herein.

The cognitive document digitization engine 120 extrapolates 8 rows in all three columns as shown in rows 572, 573, 574, 575, 576, 577, 578, and 579. Column headings in a top row 571 has been added into the table 570, however, because there is no textual information for the column headings in the tabular object cluster 550 of FIG. 6, no text is filled in.

Figure 8:
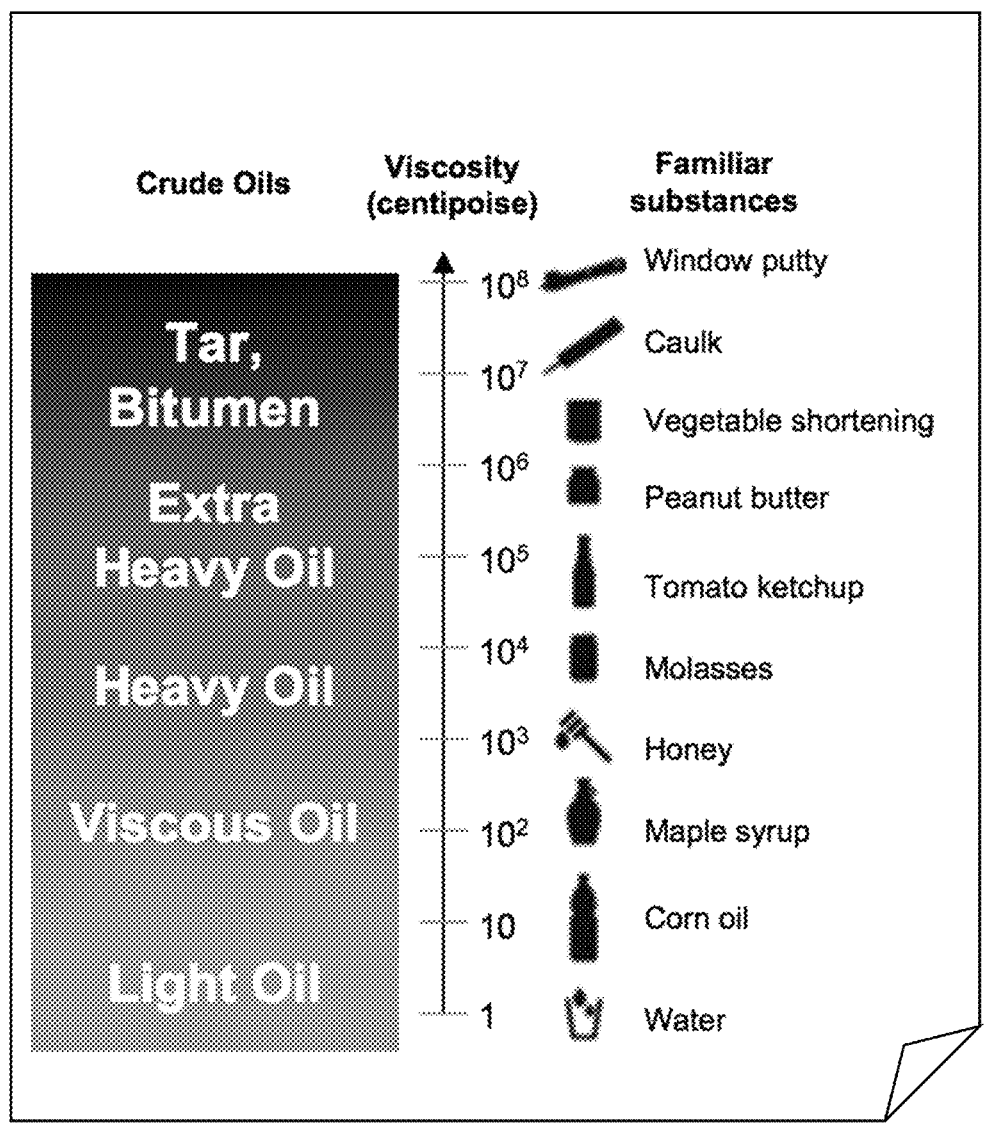
FIG. 8 depicts another exemplary tabular object cluster, in accordance with one or more embodiments set forth herein.
Figure 9:
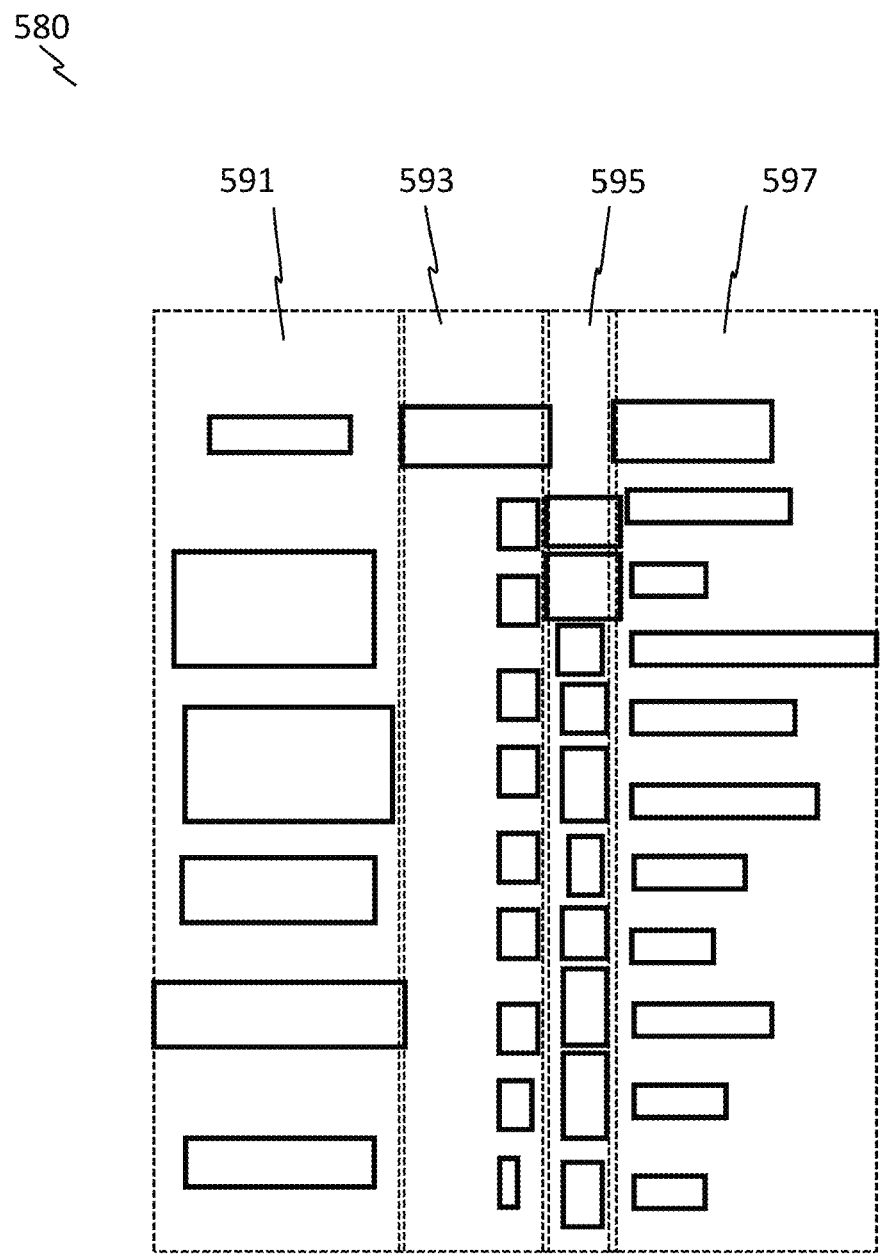
FIG. 9 depicts microblocks and macroblocks identified from the exemplary tabular object cluster of FIG. 8, in accordance with one or more embodiments set forth herein.

FIG. 8 depicts another exemplary tabular object cluster 580, in accordance with one or more embodiments set forth herein; and FIG. 9 depicts microblocks and macroblocks identified from the exemplary tabular object cluster 580 of FIG. 8, in accordance with one or more embodiments set forth herein.

The tabular object cluster 580 represents a visual image of a table as ordinarily appears in various documents.

In FIG. 9, all objects in the tabular object cluster 580 are respectively marked as a box without the texts, as recognized by the cognitive document digitization engine 120 in analyzing positional relations and determining collinearity of the objects in the tabular object cluster 580. The cognitive document digitization engine 120 identifies three (3) columns 591, 593, 597 by heuristically combining column definition attributes, which include: absolute distances between macroblocks; relative distances between objects within respective macroblocks; semantic interpolation; and relative styles. The cognitive document digitization engine 120 may determine collinearity in columns even if some overlap amongst the columns may be present. In processing column definition attributes of the tabular object cluster 580, the cognitive document digitization engine 120 measures distances between objects and calculates mean, median, mode widths as well as quantiles and related confidence intervals and frequency counts for observations.

A first column 591 of the tabular object cluster 580 has five (5) rows, except a column heading. A second column 593 has nine (9) data rows, and a third column 597 has ten (10) data rows. Accordingly, data cells of the tabular object cluster 580 may form a table as a 3×10 matrix. The dotted boxes in the tabular object cluster 580 show respective collinearities amongst data cells.

In the first column 591, the cognitive document digitization engine 120 isolates the texts from the background image, and analyzes positions of the texts. The cognitive document digitization engine 120 extrapolates 5 rows in the first column into 10 rows of the third column 597, based on extended collinearity primarily from positional relationships between the rows of both columns. The cognitive document digitization engine 120 also similarly extrapolates the 9 rows of the second column 593 into 10 rows of the third column 597, primarily based on horizontal collinearity of the microblocks across the columns. Based on the column heading position of the third column 597, an image column 595 may be identified as an extra column to the third column 597.

The tabular object cluster 580 is an example classified as the table class with merged cells. The cognitive document digitization engine 120 aligns rows across the columns 591, 593, 595, 597 by a downstream merge algorithm and merges rows within each column from a top cell down to the last available cell.

FIG. 10 depicts a table 600 corresponding to the exemplary tabular object cluster 580 of FIG. 8, as created by the cognitive document digitization engine 120, in accordance with one or more embodiments set forth herein.

In the first column under "Crude Oils" heading, in order to have the data cells in the table have same number of rows in each column for computational conveniences of a well-formed matrix, the cognitive document digitization engine 120 replicates the data in all merged cells, as shown in rows 602 and 603, rows 604, 605, and 606, rows 607 and 608, and rows 609 and 610. In the second column under "Viscosity (centipoise)" heading, the cognitive document digitization engine 120 similarly replicates the data in merged cells, as shown in rows 604 and 605.

The cognitive document digitization engine 120 extracts non-text contents such as images in column 595 of FIG. 9 for each microblock, stores in a file system, and places a link to reference each image in the table 600. The cognitive document digitization engine 120 may replace the images with respective classification texts for the images in the table 600.

Figure 12:
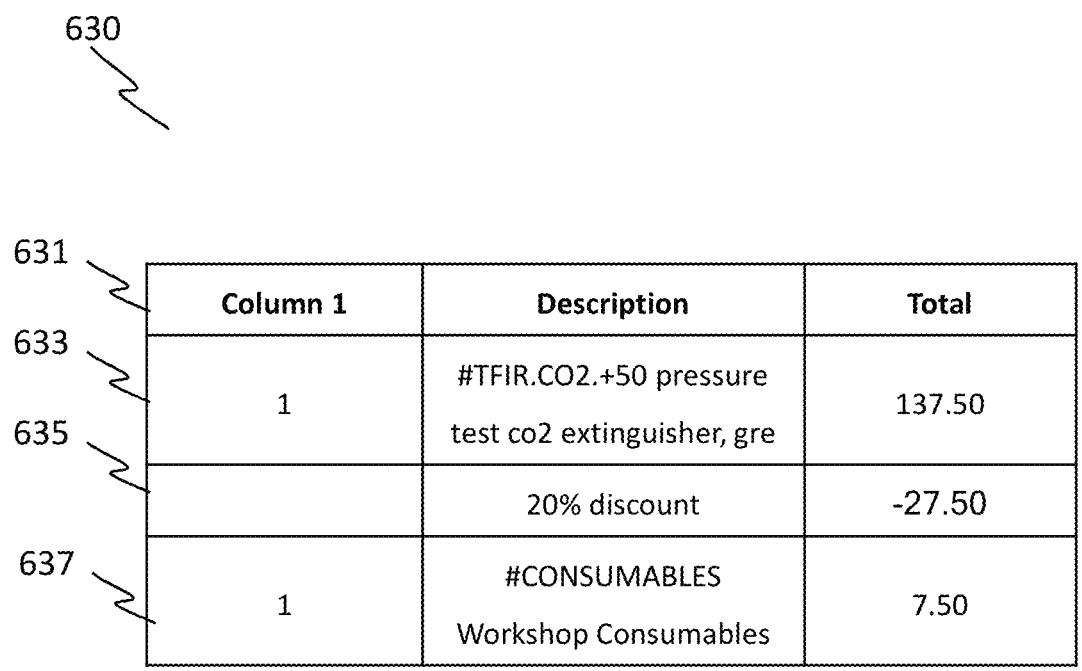
FIG. 12 depicts a nested table corresponding to a cell in the tabular object cluster of FIG. 11, as created by the cognitive document digitization engine, in accordance with one or more embodiments set forth herein.

FIG. 11 depicts a portion of still another exemplary tabular object cluster 620, in accordance with one or more embodiments set forth herein; and FIG. 12 depicts a nested table 630 corresponding to a cell 623 in the tabular object cluster 620 of FIG. 11, as created by the cognitive document digitization engine 120, in accordance with one or more embodiments set forth herein.

The cognitive document digitization engine 120 classifies the tabular object cluster 620 as a table class with nested cells, indicating that a cell is another table. Nested tables are commonly used for invoices and other form documents, and utility of automatically extracting computational data from the nested tables with accuracy is desirable. The cognitive document digitization engine 120 extracts a second tabular object cluster 625 in a cell of "Description" column. The cognitive document digitization engine 120 creates an inner table 630 of FIG. 12 based on the second tabular object cluster 625, and links the inner table 630 from a data cell 623 of an outer table based on the tabular object cluster 620, because the inner table 630 is associated with "J33409 Hydro of CO2 cylinder" text from the data cell 623. Accordingly, the cognitive document digitization engine 120 maintains semantic relationship between the outer table and the inner table 630.

The cognitive document digitization engine 120 identifies three (3) columns from the second tabular object cluster 625. Data "1" and text "# TFIR.CO2 . . . ." are separated by "x" symbol, followed by data "137.50". Based on semantic analysis and/or key ontology data, the cognitive document digitization engine 120 extract data "1" and text "# TFIR.CO2 . . . ." in separate columns as distinctive data as "x" ordinarily indicates multiplication in nature, and "137.50" is of a dollar amount data type.

The cognitive document digitization engine 120 identifies 3×3 data matrix from the second tabular object cluster 625, and constructs the second table 630 by identifying microblocks in each column, a column heading in top row 631, and three (3) rows 633, 635, 637.

Figure 13:
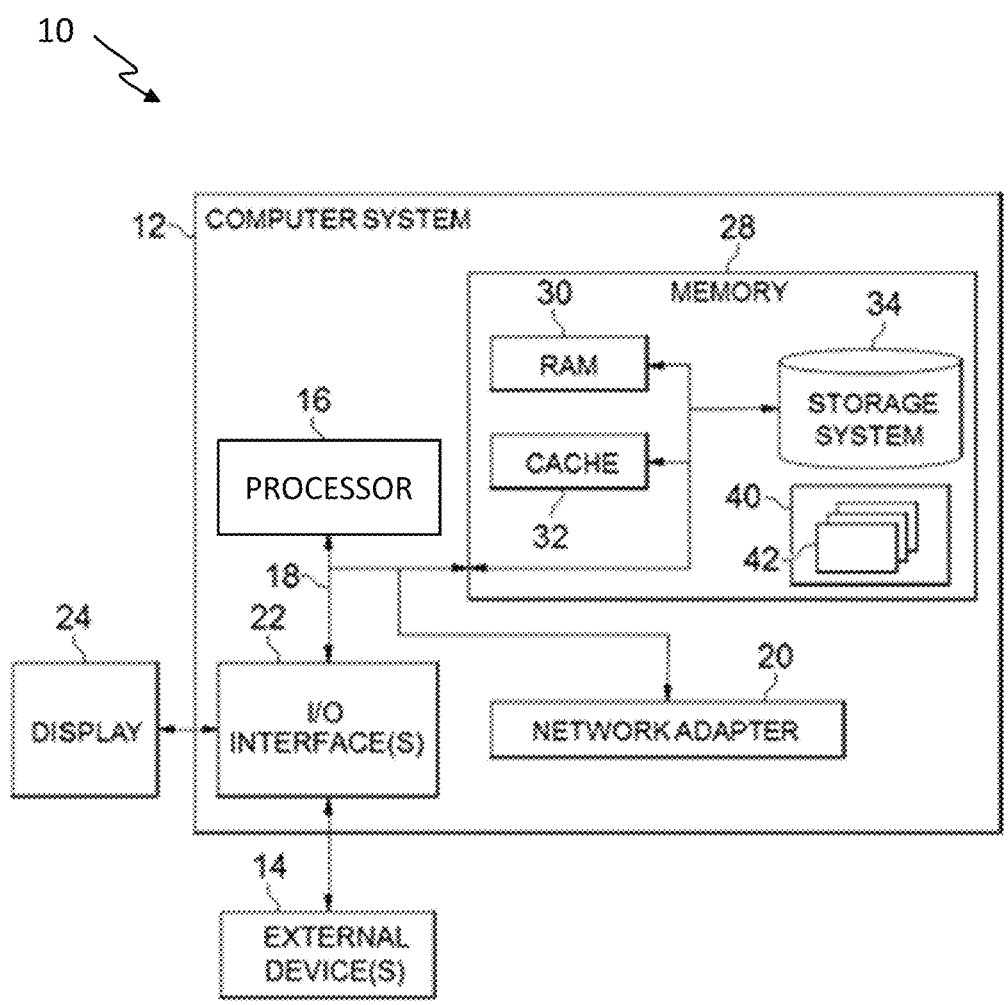
FIG. 13 depicts a cloud computing node according to an embodiment of the present invention.
Figure 14:
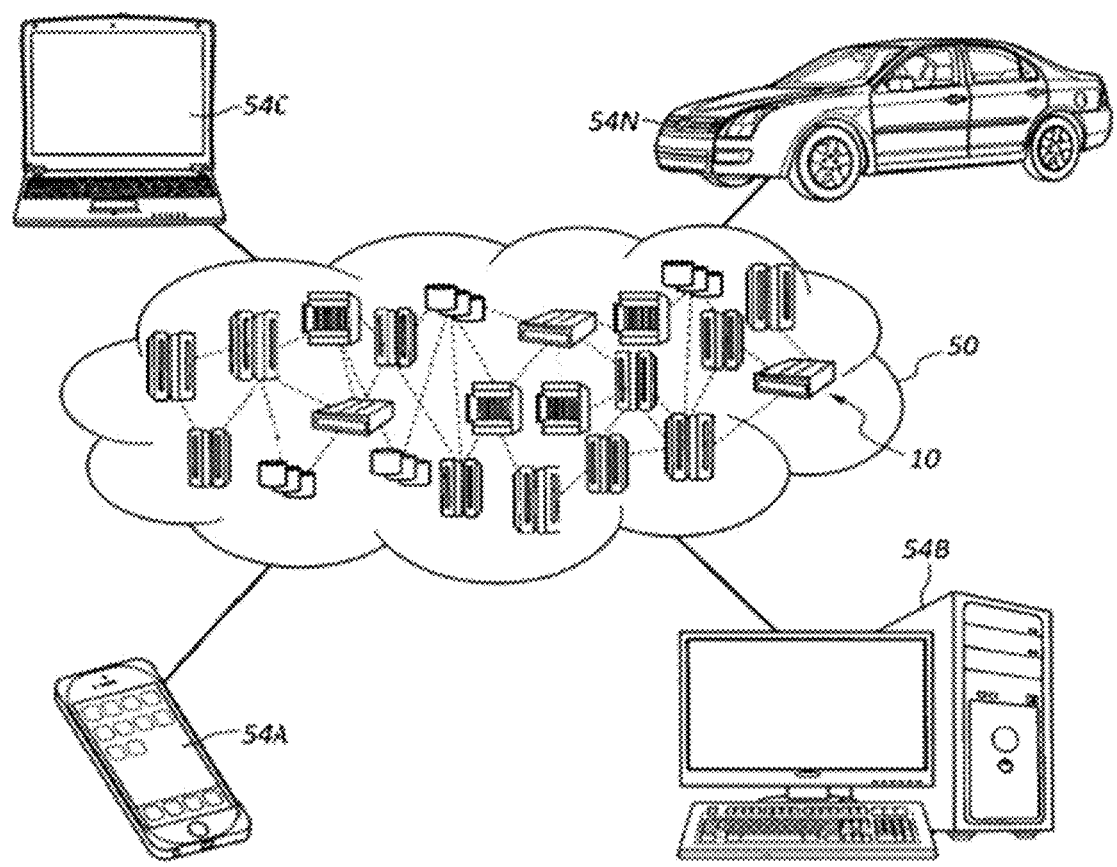
FIG. 14 depicts a cloud computing environment according to an embodiment of the present invention.
Figure 15:
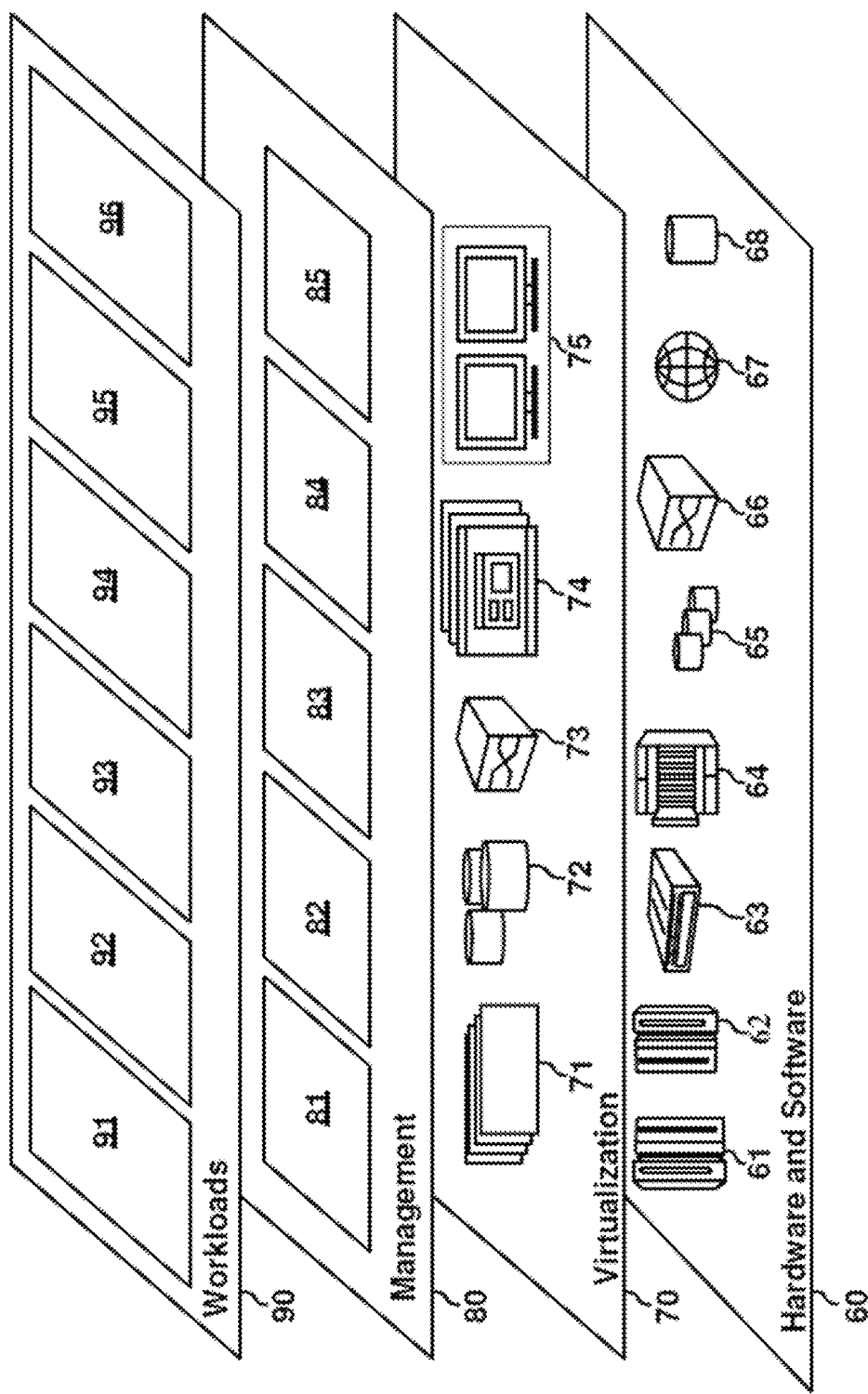
FIG. 15 depicts abstraction model layers according to an embodiment of the present invention.

FIGS. 13-15 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 13, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 13, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive document digitization engine 120 of FIG. 1. Program processes 42, as in the cognitive document digitization engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the document digitization services as provided by the cognitive document digitization engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for extracting data from a document image comprising:
    obtaining, by one or more processor of a computer, the document image, wherein the document image includes a plurality of objects;
    identifying a plurality of microblocks respectively corresponding to the plurality of objects, wherein each of the microblocks is associated with a content, a position, and a style;
    discovering that a first microblock is collinear with a second microblock based on respective positional characteristics of the first microblock and the second microblock and adjustable collinearity parameters;
    identifying a macroblock with the first microblock and the second microblock, wherein the macroblock constitutes a key-value pair that is computational by computer programs;
    associating a confidence level with the key-value pair based on heuristics; and
    communicating the key-value pair and the associated confidence level to a user.

2. The computer implemented method of claim 1, the discovering comprising: ascertaining that the first microblock and the second microblock are immediately adjacent with each other based on analyzing the respective positional characteristics of the first microblock and the second microblock; ascertaining that the first microblock and the second microblock are either horizontally or vertically aligned; and determining that the first microblock and the second microblock are collinear.

3. The computer implemented method of claim 1, the discovering comprising: ascertaining that the first microblock and the second microblock are immediately adjacent with each other based on analyzing the respective positional characteristics of the first microblock and the second microblock; ascertaining that both the first microblock and the second microblock are enclosed in a certain geometric area that does not enclose another microblock; and determining that the first microblock and the second microblock are collinear.

4. The computer implemented method of claim 1, the discovering comprising: ascertaining that the first microblock and the second microblock are immediately adjacent with each other based on analyzing the respective positional characteristics of the first microblock and the second microblock; analyzing respective semantic contents of both the first microblock and the second microblock, wherein the semantic contents is a member of the adjustable collinearity parameters; ascertaining that a first semantic content of the first microblock is associated with a key name discovering, from key ontology data corresponding to the key name, that a second semantic content of the second microblock is of a data type corresponding to the key name; and determining that the first microblock and the second microblock are collinear.

5. The computer implemented method of claim 1, wherein the style includes a font type, a font size, a paragraph alignment, and zero or more punctuation delimiter, and wherein the adjustable collinearity parameters include the style.

6. The computer implemented method of claim 1, further comprising: ascertaining a document class for the document image; determining that a class key specified in the document class is missing from a set of macroblocks for the document image; searching respective contents of the microblocks from the identified macroblocks for an alias corresponding to the missing class key; selecting another macroblock associated one of the microblocks having the alias as content; and identifying another key-value pair with the selected another macroblock in place of a key-value pair for the missing class key.

7. A computer program product comprising:
  a computer readable storage medium readable by one or more processor and storing instructions for execution by the one or more processor for performing a method for extracting data from a document image comprising:
    obtaining the document image, wherein the document image includes a plurality of objects;
    identifying a plurality of microblocks respectively corresponding to the plurality of objects, wherein each of the microblocks is associated with a content, a position, and a style;
    discovering that a first microblock is collinear with a second microblock based on respective positional characteristics of the first microblock and the second microblock and adjustable collinearity parameters;
    identifying a macroblock with the first microblock and the second microblock, wherein the macroblock constitutes a key-value pair that is computational by computer programs;
    associating a confidence level with the key-value pair based on heuristics; and
    communicating the key-value pair and the associated confidence level to a user.

8. The computer program product of claim 7, the discovering comprising: ascertaining that the first microblock and the second microblock are immediately adjacent with each other based on analyzing the respective positional characteristics of the first microblock and the second microblock; ascertaining that the first microblock and the second microblock are either horizontally or vertically aligned; and determining that the first microblock and the second microblock are collinear.

9. The computer program product of claim 7, the discovering comprising: ascertaining that the first microblock and the second microblock are immediately adjacent with each other based on analyzing the respective positional characteristics of the first microblock and the second microblock; ascertaining that both the first microblock and the second microblock are enclosed in a certain geometric area that does not enclose another microblock; and determining that the first microblock and the second microblock are collinear.

10. The computer program product of claim 7, the discovering comprising: ascertaining that the first microblock and the second microblock are immediately adjacent with each other based on analyzing the respective positional characteristics of the first microblock and the second microblock; analyzing respective semantic contents of both the first microblock and the second microblock, wherein the semantic contents is a member of the adjustable collinearity parameters; ascertaining that a first semantic content of the first microblock is associated with a key name; discovering, from key ontology data corresponding to the key name, that a second semantic content of the second microblock is of a data type corresponding to the key name; and determining that the first microblock and the second microblock are collinear.

11. The computer program product of claim 7, wherein the style includes a font type, a font size, a paragraph alignment, and zero or more punctuation delimiter, and wherein the adjustable collinearity parameters include the style.

12. The computer program product of claim 7, further comprising: ascertaining a document class for the document image; determining that a class key specified in the document class is missing from a set of macroblocks for the document image; searching respective contents of the microblocks from the identified macroblocks for an alias corresponding to the missing class key; selecting another macroblock associated one of the microblocks having the alias as content; and identifying another key-value pair with the selected another macroblock in place of a key-value pair for the missing class key.

13. A system comprising:
  a memory;
  one or more processor in communication with the memory; and
  program instructions executable by the one or more processor via the memory to perform a method for extracting data from a document image comprising:
    obtaining the document image, wherein the document image includes a plurality of objects;
    identifying a plurality of microblocks respectively corresponding to the plurality of objects, wherein each of the microblocks is associated with a content, a position, and a style;
    discovering that a first microblock is collinear with a second microblock based on respective positional characteristics of the first microblock and the second microblock and adjustable collinearity parameters;

identifying a macroblock with the first microblock and the second microblock, wherein the macroblock constitutes a key-value pair that is computational by computer programs;

associating a confidence level with the key-value pair based on heuristics; and communicating the key-value pair and the associated confidence level to a user.

* * * * *

UNITED STATES PATENT AND TRADEMARK OFFICE
CERTIFICATE OF CORRECTION

PATENT NO. : 10,592,738 B2
APPLICATION NO. : 15/829304
DATED : March 17, 2020
INVENTOR(S) : Kevin Northrup et al.

Page 1 of 1

It is certified that error appears in the above-identified patent and that said Letters Patent is hereby corrected as shown below:

On the Title Page

In the Title (54), delete "COGNITIVE DOCUMENT IMAGE DIGITILIZATION" and insert
--COGNITIVE DOCUMENT IMAGE DIGITIZATION--.

Signed and Sealed this
Fourteenth Day of July, 2020

Andrei Iancu
*Director of the United States Patent and Trademark Office*